(12) United States Patent
Yang et al.

(10) Patent No.: US 9,770,797 B2
(45) Date of Patent: Sep. 26, 2017

(54) TOOL POSITIONING AND HOLDING MECHANISM

(71) Applicants: FU DING ELECTRONICAL TECHNOLOGY (JIASHAN) CO., LTD., Zhejiang (CN); HON HAI PRECISION INDUSTRY CO., LTD., New Taipei (TW)

(72) Inventors: Ming-Lu Yang, New Taipei (TW); Yang-Mao Peng, Jiashan (CN); Jian-Shi Jia, Jiashan (CN); Jing-Shuang Sui, Jiashan (CN); Zhen-Guang Xu, Jiashan (CN); Jun Fu, Jiashan (CN); Jie Li, Jiashan (CN)

(73) Assignees: FU DING ELECTRICAL TECHNOLOGY (JIASHAN) CO., LTD., Jianshan (CN); HON HAI PRECISION INDUSTRY CO., LTD., New Taipei (TW)

( * ) Notice: Subject to any disclaimer, the term of this patent is extended or adjusted under 35 U.S.C. 154(b) by 265 days.

(21) Appl. No.: 14/711,923

(22) Filed: May 14, 2015

(65) Prior Publication Data
US 2016/0114443 A1 Apr. 28, 2016

(30) Foreign Application Priority Data

Oct. 24, 2014 (CN) .......................... 2014 1 0574186

(51) Int. Cl.
*B23Q 3/02* (2006.01)
*F16B 2/10* (2006.01)
(Continued)

(52) U.S. Cl.
CPC ............. *B23Q 3/02* (2013.01); *B23Q 1/4876* (2013.01); *B23Q 16/02* (2013.01); *F16B 2/10* (2013.01);
(Continued)

(58) Field of Classification Search
CPC . B23Q 3/02; B23Q 1/48; B23Q 16/02; B23Q 1/4876; F16B 2/10; Y10T 409/307672
(Continued)

(56) References Cited

U.S. PATENT DOCUMENTS 6,439,631 B1 * 8/2002 Kress ................... B65G 47/918
294/65
6,539,600 B2 * 4/2003 Wu .......................... B23P 19/02
269/234
(Continued)

FOREIGN PATENT DOCUMENTS

EP 2745959 A2 6/2014

*Primary Examiner* — Larry E Waggle, Jr.
*Assistant Examiner* — Mahdi H Nejad
(74) *Attorney, Agent, or Firm* — Steven Reiss

(57) ABSTRACT

A tool positioning and holding mechanism includes a mounting frame, a feed member, a tool support, a positioning member, an elastic member, and a blocking member. The feed member is slidably mounted on the mounting frame. The tool support is fixed on the feed member and defines a receiving hole to receive the tool. The positioning member is pivotally coupled to the tool support and partially received in the tool support. The elastic member is located between the positioning member and the tool support. The blocking member is fixed on the mounting frame and includes a pushing portion configured to resist the positioning member. The feed member can move the positioning member to allow detachment of the positioning member from the pushing portion, and upon detachment of the positioning member, the positioning member is configured to rotate under an elastic force of the elastic member to position the tool.

10 Claims, 5 Drawing Sheets

(51) Int. Cl.
*B23Q 1/48* (2006.01)
*B23Q 16/02* (2006.01)

(52) U.S. Cl.
CPC .................. *Y10T 29/53961* (2015.01); *Y10T 409/307672* (2015.01)

(58) Field of Classification Search
USPC ............................... 29/271, 281.1; 409/201
See application file for complete search history.

(56) References Cited

U.S. PATENT DOCUMENTS

| | | | | |
|---|---|---|---|---|
| 6,626,281 | B2* | 9/2003 | Chiang | B21D 28/265 198/345.3 |
| 7,857,296 | B2* | 12/2010 | Lu | G06F 1/1681 269/311 |
| 8,915,527 | B2* | 12/2014 | Watanabe | B65G 49/00 294/119.1 |
| 9,277,686 | B2* | 3/2016 | Jia | H05K 13/0404 |
| 2009/0278297 | A1* | 11/2009 | Wang | F16B 2/10 269/212 |
| 2012/0034058 | A1* | 2/2012 | Jin | B25J 9/041 414/591 |
| 2012/0291247 | A1* | 11/2012 | Wang | H01Q 1/243 29/281.1 |
| 2014/0007395 | A1* | 1/2014 | Hemingway | B25B 25/005 29/281.1 |
| 2015/0029646 | A1* | 1/2015 | Liang | G06F 1/1658 361/679.02 |

\* cited by examiner

TOOL POSITIONING AND HOLDING MECHANISM

FIELD

The subject matter herein generally relates to tool handling and presentation.

BACKGROUND

During the machining process of a workpiece, a tool is usually mounted on a tool support via a positioning member to cut the workpiece.

BRIEF DESCRIPTION OF THE DRAWINGS

Implementations of the present technology will now be described, by way of example only, with reference to the attached figures.

DETAILED DESCRIPTION

Figure 1:
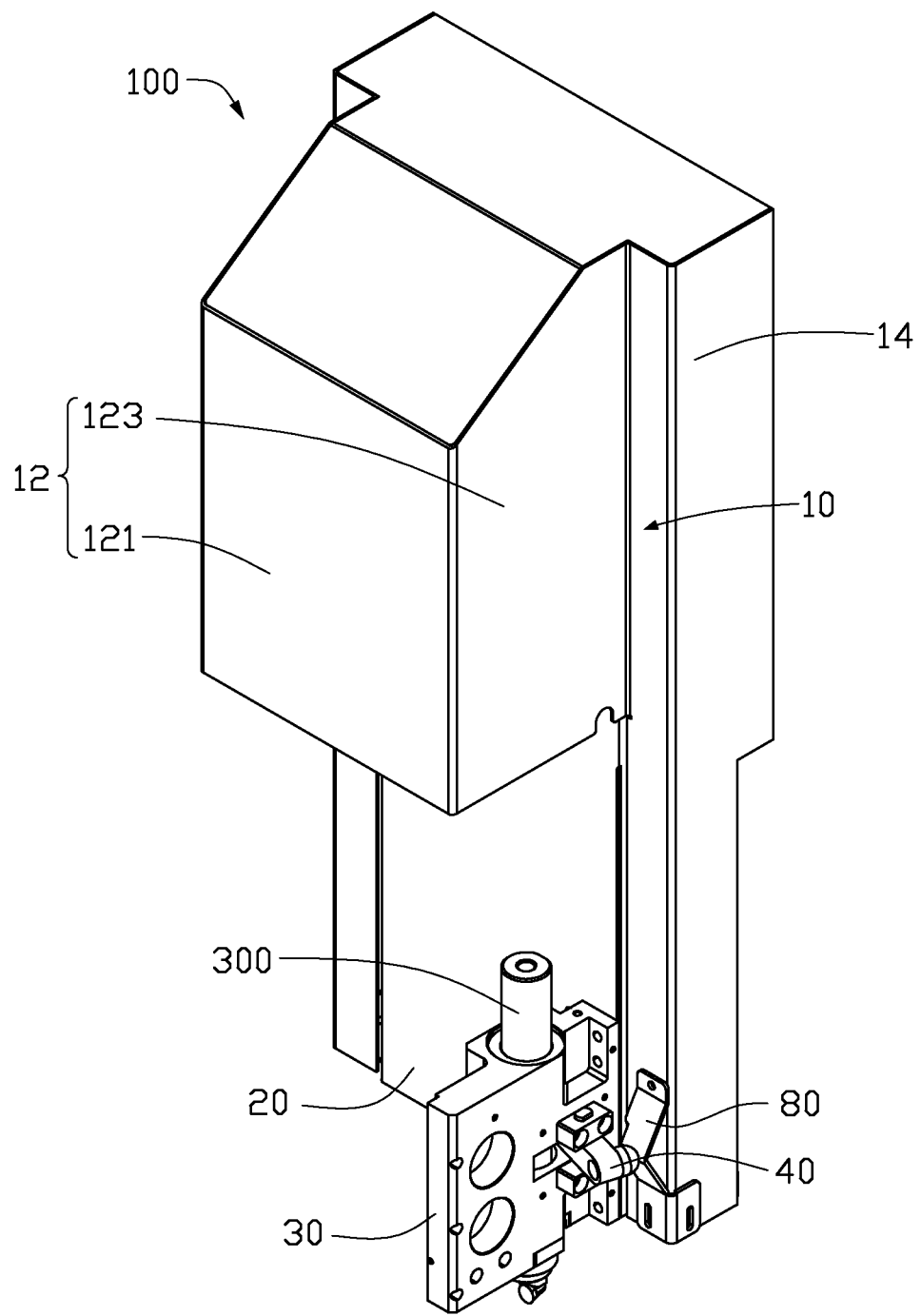
FIG. 1 is an isometric view of an embodiment of a tool positioning and holding mechanism.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure.

Several definitions that apply throughout this disclosure will now be presented.

The term "coupled" is defined as connected, whether directly or indirectly through intervening components, and is not necessarily limited to physical connections. The connection can be such that the objects are permanently connected or releasably connected. The term "substantially" is defined to be essentially conforming to the particular dimension, shape, or other feature that the term modifies, such that the component need not be exact. For example, "substantially cylindrical" means that the object resembles a cylinder, but can have one or more deviations from a true cylinder. The term "comprising," when utilized, means "including, but not necessarily limited to"; it specifically indicates open-ended inclusion or membership in the so-described combination, group, series and the like.

A tool positioning and holding mechanism for positioning a tool can include a mounting frame, a feed member, a tool support, a positioning member, an elastic member, and a blocking member. The feed member can be slidably mounted on the mounting frame. The tool support can be fixed on the feed member, and can define a receiving hole to receive the tool. The positioning member can be pivotally coupled to the tool support and partially received in the tool support. The elastic member can have a first end resisting the positioning member and a second end configured to resist the feed member or the tool support. The blocking member can be fixed on the mounting frame and can include a pushing portion configured to resist the positioning member. The feed member can be configured to move the positioning member to allow detachment of the positioning member from the pushing portion, and upon detachment of the positioning member, the positioning member can be configured to rotate under an elastic force of the elastic member to position the tool.

Figure 3:
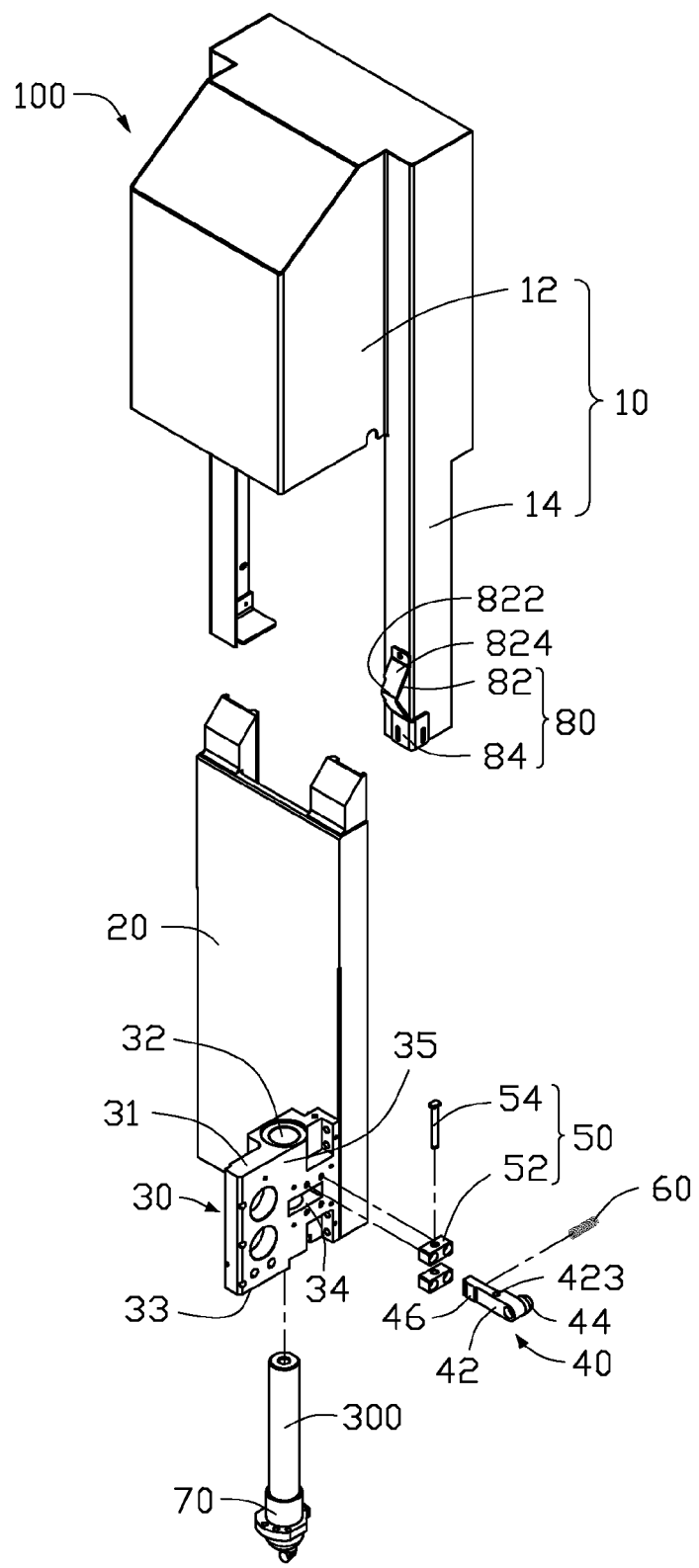
FIG. 3 is an exploded, isometric view of the tool positioning and holding mechanism of FIG. 1.

FIGS. 1 and 3 illustrate an embodiment of a tool positioning and holding mechanism 100 for positioning a tool 300. The tool positioning and holding mechanism 100 can include a mounting frame 10, a feed member 20, a tool support 30, a positioning member 40, a pivot connecting member 50, an elastic member 60, a number of guide sleeves 70, and a blocking member 80. The feed member 20 can be slidably mounted on the mounting frame 10. The tool support 30 can be securely mounted on the feed member 20. The positioning member 40 can be pivotally coupled to the tool support 30. The elastic member 60 can resist the positioning member 40. The guide sleeves 70 can be mounted on the tool support 30, and spaced from each other.

Figure 2:
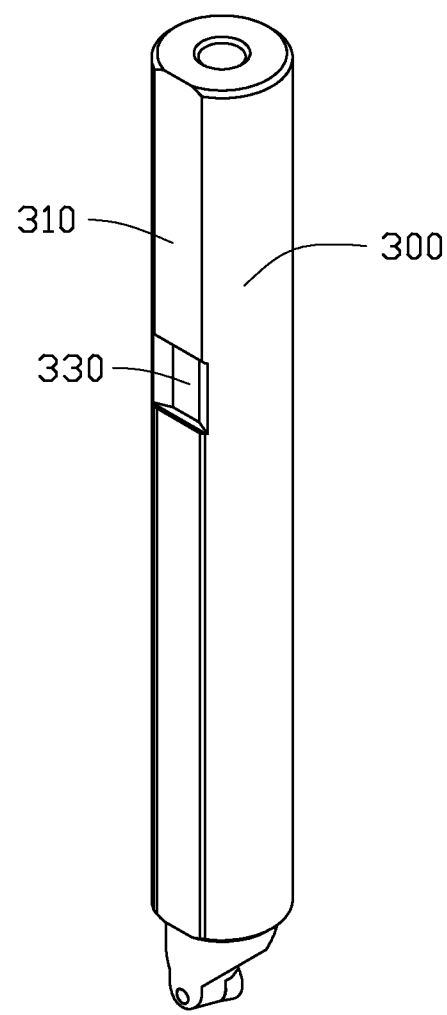
FIG. 2 is an isometric view of an embodiment of a tool which can be positioned and held by the mechanism of FIG. 1.

FIG. 2 illustrates that the tool 300 can be substantially cylindrical, and can define a fixing surface 310 and a positioning groove 330 on an outer surface thereof. The fixing surface 310 can be substantially flat, and can extend along the length of the tool 300. The positioning groove 330 can be defined on the fixing surface 310. In at least one embodiment, the positioning groove 330 can defined on a surface of the tool 300 other than the fixing surface 310.

Figure 4:
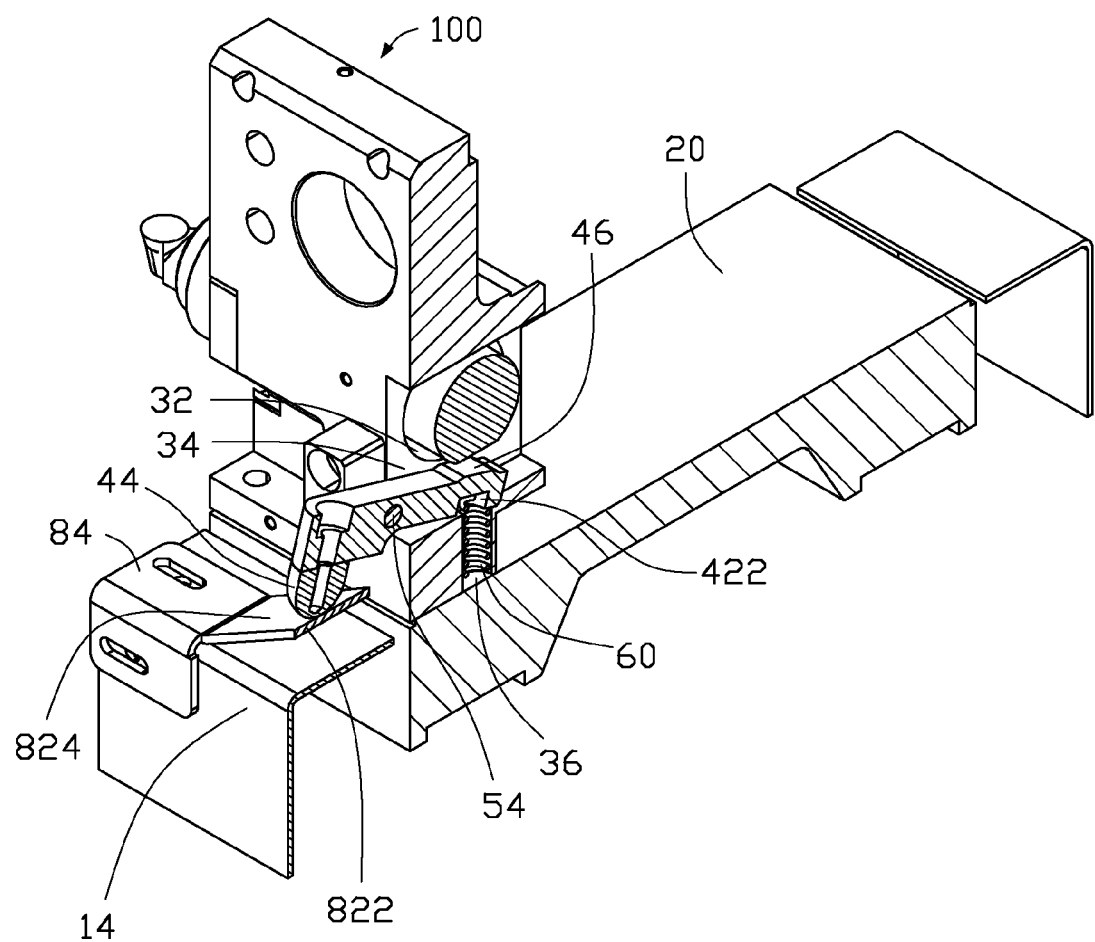
FIG. 4 is a cross-sectional, isometric view of the tool positioning and holding mechanism of FIG. 1.

FIGS. 3 and 4 illustrate that the mounting frame 10 can include a cover 12, and two side plates 14 mounted on opposite sides of the cover 12. The cover 12 can be substantially in a shape of "π". The cover 12 can include a top plate 121, and two connecting plates 123 extending from opposite side edges of the top plate 121. The connecting plates 123 can be located on the same side of the top plate 121 and parallel to each other. Each side plate 14 can be substantially in a shape of "T" and adjoining the connecting plate 123. A side surface of the cover 12, and opposite surfaces of two side plates 14 can cooperatively form a mounting chamber (not shown). In at least one embodiment, a sliding rail (not shown) can be mounted on each of two side plates 14. The feed member 20 can be substantially plate-shaped, and slidably mounted on two side plates 14 via the sliding rails. The feed member 20 can slide along the length of the side plate 14 in the mounting chamber.

The tool support 30 can be securely mounted to an end of the feed member 20, and positioned adjacent to one side plate 14. The tool support 30 can include a first end face 31, a second end face 33 opposite to the first end face 31, and four side faces 35 interconnecting the first end face 31 and the second end face 33. The tool support 30 can define a receiving hole 32, a mounting hole 34, and a holding hole 36 therein. The receiving hole 32 can pass through the first end face 31 and the second end face 33. The mounting hole 34 can pass through opposite side faces 35 and communicate with the receiving hole 32. The holding hole 36 can pass through the side face 35 which touches the feed member 20.

The holding hole 36 can communicate with the mounting hole 34. In at least one embodiment, the holding hole 36 can be a groove defined in the tool support 30.

The blocking member 80 can be securely mounted on one side plate 14. The blocking member 80 can include a pushing portion 82, and two plate portions 84 extending from opposite sides of the pushing portion 82. The pushing portion 82 can be substantially V-shaped, and can include two extending portions 824 interconnecting with each other. A first end of one extending portion 824 can be securely coupled to the side plate 14 of the mounting frame 10 via one plate portion 84, and a second end of the extending portion 824 can be coupled to another extending portion 824. Each extending portion 824 can be flattened and inclined to the side plates 14, an angle between the two extending portions 814 can be an acute angle. Two extending portions 824 can be coupled to each other via a connecting portion 822. A gap (not shown) can be formed between each extending portion 824 and the side plate 14. A distance between the connecting portion 822 and the side plate 14 can be more than the distance between any portion of each extending portion 824 and the side plate 14. Each plate portion 84 can cover and touch a portion of the side plate 14, to be securely coupled to the side plate 14.

In at least one embodiment, the blocking member 80 can include one plate portion 84, and the pushing portion 82 can be securely coupled to the side plate 14 via the extending portion 824. In at least one embodiment, the shape of each extending portion 824 can be other than as described above, so long as the maximum distance between each extending portion 824 and the side plate 14 can be less than the distance between the connecting portion 822 and the side plate 14. In at least one embodiment, the pushing portion 82 can be a solid block, thus each portion of the pushing portion 82 can touch the side plate 14.

The pivot connecting member 50 can include two mounting bases 52 and a shaft 54 interconnecting the two mounting bases 52. Two mounting bases 52 can be securely mounted on one side face 35 of the tool support 30 and located on opposite sides of the mounting hole 36. In at least one embodiment, the mounting bases 52 can be integrated with the tool support 30.

The positioning member 40 can include a positioning body 42, a protrusion 44, and a positioning portion 46. The positioning body 42 can be substantially plate-shaped, rotatably mounted on the shaft 54, and partially received in the mounting hole 34. The positioning body 42 can define a receiving groove 422 on a side thereof. The positioning body 42 can further define a connecting hole 423 to movably receive the shaft 54. The receiving groove 422 can match, and communicate with, the holding hole 36. The protrusion 44 can protrude from a side of the positioning body 42 to resist the connecting portion 882 of the pushing portion 82. The protrusion 44 and the receiving groove 422 can be located on the same side of the positioning body 42, and spaced from each other. The positioning portion 46 can be substantially a boss, and can protrude from a side of the positioning body 42 away from the protrusion 44. The positioning portion 46 can match the positioning groove 330 to be received in the positioning groove 330. In at least one embodiment, the location of the positioning portion 46 can correspond to that of the receiving groove 422.

The elastic member 60 can be received in the receiving groove 422 and the holding hole 36, and can have a predetermined deformation. A first end of the elastic member 60 can resist the positioning member 40, and a second end of the elastic member 60 can resist the feed member 20 or the tool support 30. The guide sleeves 70 can be received in the receiving hole 32. In at least one embodiment, the tool positioning and holding mechanism 100 can include two guide sleeves 70, which are respectively received in opposite ends of the receiving hole 32, respectively adjacent to the first end face 31 and the second end face 33, and configured to guide the tool 300. In at least one embodiment, the number of guide members 70 can be changed as needed.

Figure 5:
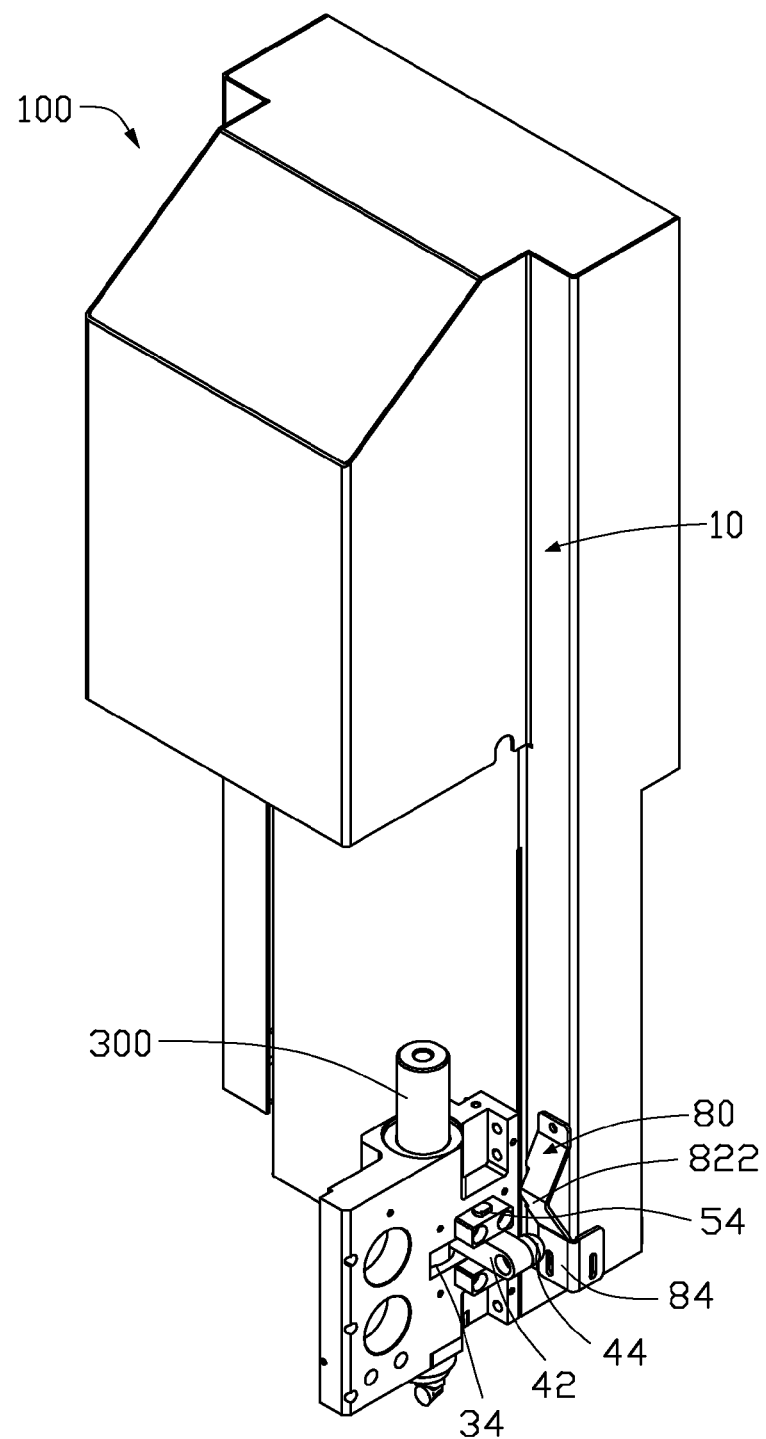
FIG. 5 is similar to FIG. 1, but showing the tool positioning and holding mechanism in a state of use.

FIGS. 2, 4 and 5 illustrate the device in use. The tool 300 can be received in the receiving hole 32, and the feed member 20 can drive the tool support 30 to slide along the side plate 14. The protrusion 44 of the positioning member 40 can break away from the connecting portion 822 of the pushing portion 82, then the positioning body 42 of the positioning member 40 can rotate around the shaft 54 under the restoring force of the elastic 60. The protrusion 44 can then move to the plate portion 84 along the pushing portion 82. When the protrusion 44 resists the plate portion 84, the positioning portion 46 of the positioning member 40 can be received in the positioning groove 330 to position the tool 300.

In at least one embodiment, the plate portion 84 can be omitted. The pushing portion 82 can be directly fixed on the side plate 14 and the protrusion 44 can be moved to the side plate 14 to lead the positioning portion 46 to latch with the positioning groove 330. In at least one embodiment, the protrusion 44 can be moved to the extending portion 824 to lead the positioning portion 46 to latch with the positioning groove 330. In at least one embodiment, the positioning member 40 cannot latch with the tool 300 so long as the positioning member 40 is positioning the tool 300.

While the present disclosure has been described with reference to particular embodiments, the description is illustrative of the disclosure and is not to be construed as limiting the disclosure. Therefore, those of ordinary skill in the art can make various modifications to the embodiments without departing from the scope of the disclosure as defined by the appended claims.

What is claimed is:

1. A tool positioning and holding mechanism for positioning a tool comprising:
   a mounting frame;
   a feed member slidably mounted on the mounting frame;
   a tool support fixed on the feed member and defining a receiving hole to receive the tool;
   a positioning member pivotally coupled to the tool support and partially received in the tool support;
   an elastic member having a first end resisting the positioning member and a second end configured to resist the feed member or the tool support; and
   a blocking member fixed on the mounting frame and comprising a pushing portion configured to resist the positioning member;
   wherein the feed member is configured to move the positioning member to allow detachment of the positioning member from the pushing portion, and upon detachment of the positioning member, the positioning member is configured to rotate under an elastic force of the elastic member to position the tool.

2. The tool positioning and holding mechanism of claim 1, wherein the pushing portion comprises two extending portions connected to each other, an end of one of said two extending portions being away from another one of said two extending portions and being securely coupled to the mounting frame.

3. The tool positioning and holding mechanism of claim 2, wherein each extending portion is inclined to the mounting frame, and an angle between the two extending portions is an acute angle.

4. The tool positioning and holding mechanism of claim 2, wherein the blocking member further comprises two plate portions, each extending portion is securely coupled to the mounting frame via a corresponding plate portion.

5. The tool positioning and holding mechanism of claim 1, wherein the tool support further defines a mounting hole therein to communicate with the receiving hole, the positioning member is partially received in the mounting hole.

6. The tool positioning and holding mechanism of claim 5, wherein the positioning member defines a receiving groove on a side, the tool support further defines a holding hole therein to communicate with the mounting hole, the elastic member is received in the receiving groove and the holding hole.

7. The tool positioning and holding mechanism of claim 1, wherein the positioning member comprises a positioning body, a protrusion protruding from a side of the positioning body to resist the pushing portion, and a positioning portion protruding from a side of the positioning body away from the protrusion to position the tool.

8. The tool positioning and holding mechanism of claim 1, wherein the tool positioning and holding mechanism further comprises a pivot connecting member, the pivot connecting member comprises two mounting bases mounted on the tool support and spaced from each other, and a shaft interconnecting the mounting bases; the positioning member is rotatably mounted on the shaft and located between the mounting bases.

9. The tool positioning and holding mechanism of claim 8, wherein the positioning member defines a connecting hole to movably receive the shaft.

10. The tool positioning and holding mechanism of claim 1, wherein the tool positioning and holding mechanism further comprises a guide sleeve received in the receiving hole to guide the tool.

* * * * *